United States Patent [19]

Tarumizu

[11] 4,246,997
[45] Jan. 27, 1981

[54] APPARATUS FOR CONTROLLING CLUTCH-EQUIPPED TORQUE CONVERTER

[75] Inventor: Yasumasa Tarumizu, Kawasaki, Japan

[73] Assignee: Kabushiki Kaisha Komatsu Seisakusho, Tokyo, Japan

[21] Appl. No.: 944,866

[22] Filed: Sep. 22, 1978

[30] Foreign Application Priority Data

Sep. 22, 1977 [JP] Japan ................................ 52/113256

[51] Int. Cl.$^3$ ............................................ F16D 39/00
[52] U.S. Cl. ................................. 192/3.27; 192/3.33
[58] Field of Search .................... 192/85 F, 3.25, 3.27, 192/3.32, 3.33, 3.57, 3.55, 3.54, 3.52, 48.1, 87.18; 74/877

[56] References Cited

U.S. PATENT DOCUMENTS

| | | | |
|---|---|---|---|
| 3,583,243 | 6/1971 | Wilson | 192/3.33 |
| 3,621,955 | 11/1971 | Black et al. | 192/3.57 |
| 3,831,725 | 8/1974 | Schott | 192/3.27 |
| 4,004,417 | 1/1977 | Woody et al. | 192/3.57 |

*Primary Examiner*—George H. Krizmanich
*Attorney, Agent, or Firm*—Armstrong, Nikaido, Marmelstein & Kubovcik

[57] ABSTRACT

An apparatus for controlling a clutch-equipped torque converter for use in a loader vehicle having a high and a low speed clutches operatively connected with the torque converter. A regulating valve is connected with the high speed clutch for controlling hydraulic fluid pressure supplied into the high speed clutch.

An accelerator for an engine and a preset lever are operatively connected with the regulating valve in such a manner that the pressure of hydraulic fluid supplied into the high speed clutch can freely be changed while the engine is in high idling region and can be kept constant while the engine is in low idling region.

4 Claims, 6 Drawing Figures

APPARATUS FOR CONTROLLING CLUTCH-EQUIPPED TORQUE CONVERTER

BACKGROUND OF THE INVENTION

This invention relates to a clutch control means for use in a clutch-equipped torque converter of variable capacity.

There has heretofore been used a clutch-equipped torque converter of variable capacity comprising a clutch having a centrifugal value means mounted between an engine and a pump's impeller, a turbine blade and a transmission gear operatively connected thereto, the arrangement being made such that the fluid pressure within the pressure chamber of said clutch can be adjusted or altered as desired.

In such a construction, the timing of slip of the clutch or the number of revolutions of the engine can be set by changing the fluid pressure within the pressure chamber of the clutch.

Stating briefly, if the fluid pressure within the pressure chamber is increased the slip of the clutch occurs at a high speed rotation of the engine, whilst when the fluid pressure is decreased, then the slip of the clutch occurs at a low speed revolution thereof.

Such construction is disadvantageous in that if the fluid pressure within the pressure chamber is reduced as the number of revolutions of the engine is set at a low value (or low idle), then the clutch will slip and so the power can not be transmitted to the transmission gear.

SUMMARY OF THE INVENTION

It is therefore an object of the present invention to provide an improved clutch-equipped torque converter for use in loader vehicles.

Another object of the present invention is to provide a clutch-equipped torque converter for use in loader vehicles wherein the clutch is allowed to slip while the engine is in high idling region but kept engaged without causing slip while the engine is in low idling region.

A further object of the invention is to provide a clutch-equipped torque converter for use in loader vehicles wherein the wear down of tires can be reduced and service life thereof can be significantly extended.

In accordance with an aspect of the present invention, there is provided an apparatus for controlling a clutch-equipped torque converter for use in a loader vehicle, comprising first clutch means disposed between input and output shafts of said torque converter and operatively connected with said torque converter;

second clutch means disposed between said torque converter and the output shaft;

a planetary gear set connected with said first and second clutch means and the output shaft;

a tank for hydraulic fluid;

pump means connected with said tank;

an engine for driving said pump means and said loader vehicle;

selector valve means connected with said pump means, said selector valve means having two positions and output side thereof being connected to either said first clutch means or said second clutch means;

regulating valve means disposed between said selector valve means and said first clutch means; and means operatively connected with said regulating valve means for controlling the same in such a way that the pressure of hydraulic fluid supplied into said first clutch means can freely be changed while said engine is in high idling region and can be kept constant while said engine is in low idling region.

Since one of the clutches, i.e. high speed clutch, is allowed to slip while the engine is in high idling region, it is possible to run the vehicle on a slippery road or terrain without causing a slip of the tires on the road even if the accelerator is depressed to a maximum.

The above and other objects, features and advantages of the present invention will be readily apparent from the following description taken in conjunction with the accompanying drawings.

DETAILED DESCRIPTION OF THE INVENTION

Figure 1:
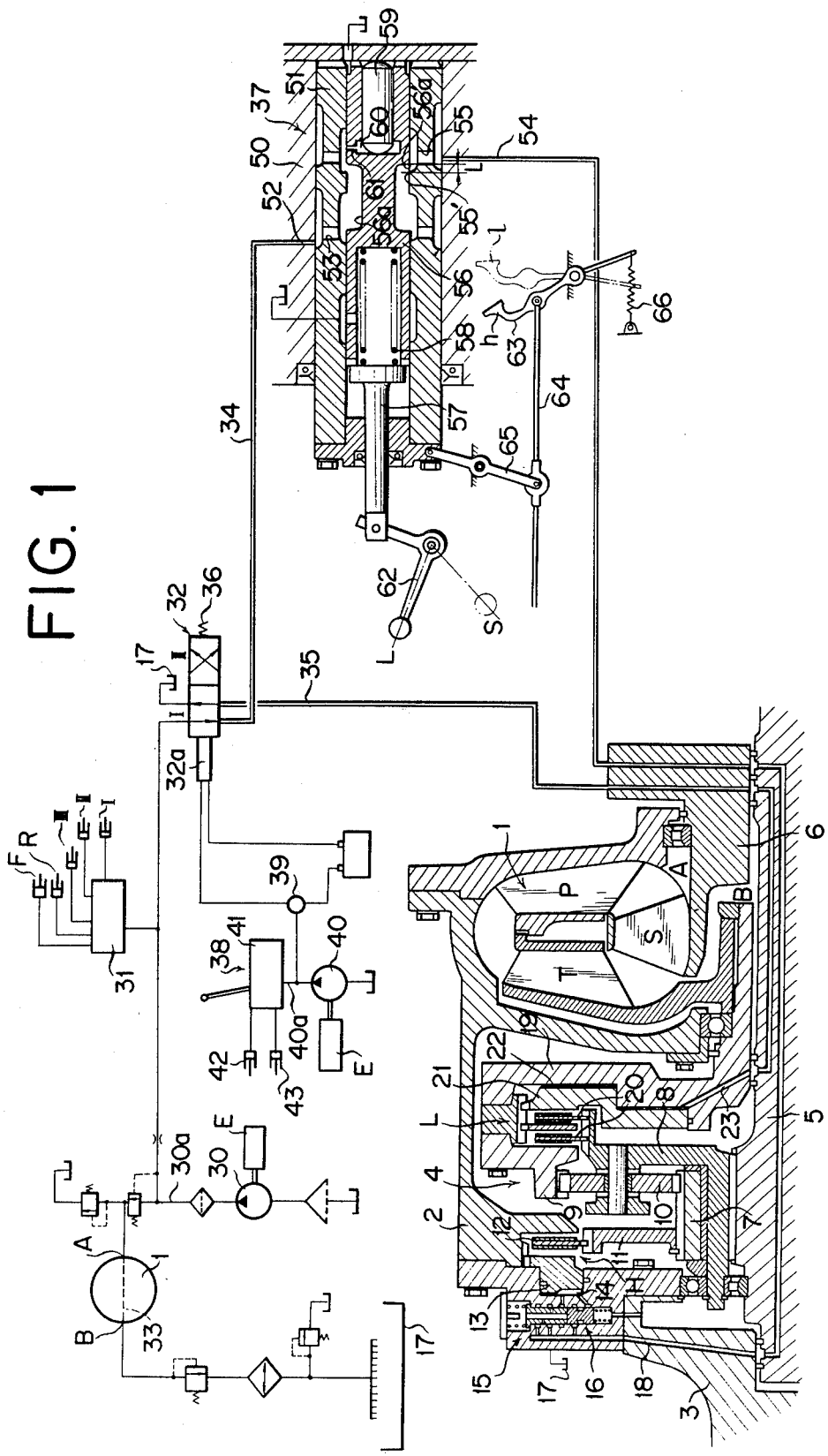
FIG. 1 is a hydraulic circuit of the present invention wherein a clutch-equipped torque converter and a regulating valve are shown in cross-section.
Figure 2:
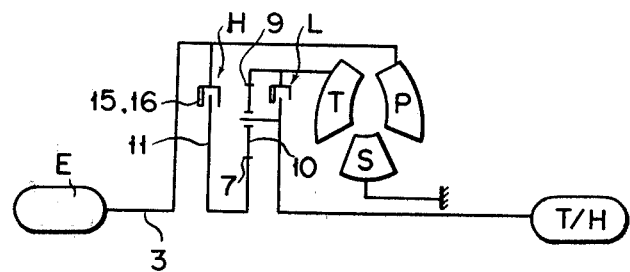
FIG. 2 is a diagrammatic view of a clutch-equipped torque converter of the present invention.

The present invention will now be described by way of example only with reference to the accompanying drawings.

Reference numeral 1 denotes a torque converter comprising a pump impeller P, a turbine T and a stater S. The pump impeller P is connected through a casing 2 to an input shaft 3, and the turbine T is connected through a planet gear means 4, a high speed clutch H and a low speed clutch L to an output shaft 5. The stater S is connected to a stationary shaft 6.

The above-mentioned planet gear means 4 comprises a sun gear 7 rotatably mounted on an output shaft 5, a carrier 8 fixedly secured to the output shaft 5, a ring gear 9 mounted on the turbine T, and a planetary gear 10 arranged to engage with the ring gear 9 and the sun gear 7.

Stating in brief, the sun gear 7 is rotatably mounted on the output shaft 5 and is engaged with a rotary member 11 in which is fitted a clutch plate 12, and a piston 13 is slidably mounted on the casing 2 which is adapted to urge the clutch plate 12 on the casing 2 thereby forming a high speed clutch H. A pressure chamber 14 is connected through a centrifugal valve 15 and a quick charge valve 16 with a drain 17 and a pressurized fluids passage 18. While, the turbine T is connected by spline to an intermediate rotary member 19 which is rotatably mounted from the outside on the output shaft 5. Clutch plates 20 are alternately mounted on the carrier 8 between the carrier and the intermediate rotary member 19 on which a piston 21 urging the clutch plates 20 is slidably mounted thereby forming a low speed clutch L. A pressure chamber 22 communicates with a pressurized fluids passage 23.

Figure 3:
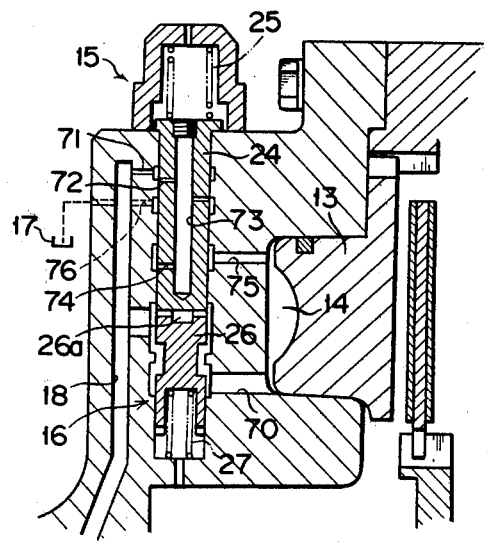
FIG. 3 is an enlarged cross-sectional view of a quick charge valve and a centrifugal valve.

As shown in FIG. 3, the centrifugal valve 15 comprises a spool 24 adapted to communicate the pressure chamber 14 with either a tank 17 or a passage 18 for pressurized fluid. The spool 24 is adapted to be kept by a spring 25 at a first position in which the pressure chamber 14 is allowed to communicate with the tank 17, and moved by the centrifugal force against the force of the spring 25 to a second position in which the pressure chamber 14 is allowed to communicate with the pressurized fluid passage 18.

The above-mentioned quick charge valve 16 comprises a spool 26 adapted to connect and disconnect the pressure chamber 14 to and from the fluid passage 18. The spool 26 is adapted to be kept by the centrifugal force and a spring 27 at a first position in which the pressure chamber 14 is allowed to communicate with the fluid passage 18, and moved by the fluid pressure within the pressure chamber 14 to a second position in which the pressure chamber 14 is disconnected from the fluid passage 18.

Reference numeral 30 denotes a charge pump driven by an engine E, the delivery side 30a of which is connected in parallel with a first chamber A of the torque converter 1, a speed changeover valve 31 and a high/low speed selector valve 32. The first chamber A is connected through a passage 33 formed within the torque converter 1 with a second chamber B which leads to the tank 17.

The speed selector valve 31 is controlled to be selectively connected with a forward clutch F, a rearward clutch R, a first speed clutch I, a second speed clutch II and a third speed clutch III. The high/low speed selector valve 32 is a solenoid valve which is adapted to connect the delivery side 30a with either a high pressure passage 34 or a low pressure passage 35 and which is normally kept by a spring 36 at a first position I wherein the valve 32 is connected with the high pressure passage 34 and kept by a solenoid 32a when energized at a second position II wherein the valve 32 is connected with the low pressure passage 35.

The high pressure passage 34 is allowed to communicate through a pressure regulator valve 37 with the first passage 18 which is connected with the pressure chamber 14 of the high speed clutch H, whilst the low pressure passage 35 communicates with the second passage 23 which is connected with the pressure chamber 22 of the low speed clutch L.

Further, the above-mentioned solenoid 32a is controlled to be energized by a fluid pressure operated switch 39 which is provided in a hydraulic circuit 38 for operating an implement. The solenoid 32a is adapted to be deenergized when the fluid pressure within the hydraulic circuit 38 is low and energized when the fluid pressure is high. The arrangement is made such that the hydraulic circuit 38 can connect delivery side 40a of a pump 40 driven by the engine E with cylinders 42 and 43 of the loader vehicle through a valve 41 thereof.

The above-mentioned pressure regulator valve 37 is constructed as mentioned below.

The regulator valve 37 comprises a valve box 50, a sleeve 51 slidably mounted within the valve box, said sleeve having a first port 53 which is opened against an inlet port 52 and a second port 55 which is opened against an outlet port 54, said first and second ports being spaced apart in the longitudinal direction of the sleeve, a pressure reducing spool 56 and a spring retainer 57 slidably mounted within said sleeve 51 so as to connect or disconnect the first port 53 with or from the second port 55, a spring 58 located between the pressure reducing spool 56 and the spring retainer 57, a back pressure chamber 60 formed by locating a load piston 59 within the pressure reducing spool 56, said back pressure chamber 60 being adapted to communicate through a small aperture 61 with the second port 55, and a preset lever 62 pivotally connected with the spring retainer 57, said sleeve 51 being connected through a lever 65 with a rod 64 which is in turn connected with an accelerator pedal 63. The accelerator pedal 63 is normally kept by a spring 66 at a low speed rotation position "l" (or low idling position). When the accelerator pedal 63 occupies the low speed rotation position "l", the sleeve 51 is moved to the left in the drawing. FIG. 1 shows the accelerator pedal 63 located at a high speed rotation position "h" (or high idling position).

The operation of the apparatus according to the present invention will now be described in detail below.

When the implement is not in use, the pressure of the fluid in the delivery side 40a of the hydraulic pump 40 is low so that the fluid pressure operated switch 39 is rendered off so as to deenergize the solenoid 32a thereby allowing the high/low speed selector valve 32 to assume its first position.

Accordingly, the pressurized fluid deliverred by the charge pump 30 is supplied through the high pressure passage 34, the pressure regulator valve 37, the first passage 18 and the spool 24 of the centrifugal valve 15 into the pressure chamber 14 so that the clutch plate 12 is urged by the piston 13 against the casing 2 thereby rendering the high speed clutch "H" on or operative. At that time, the low speed clutch L is off or inoperative since its pressure chamber 22 is connected with the drain 17.

Figure 4:
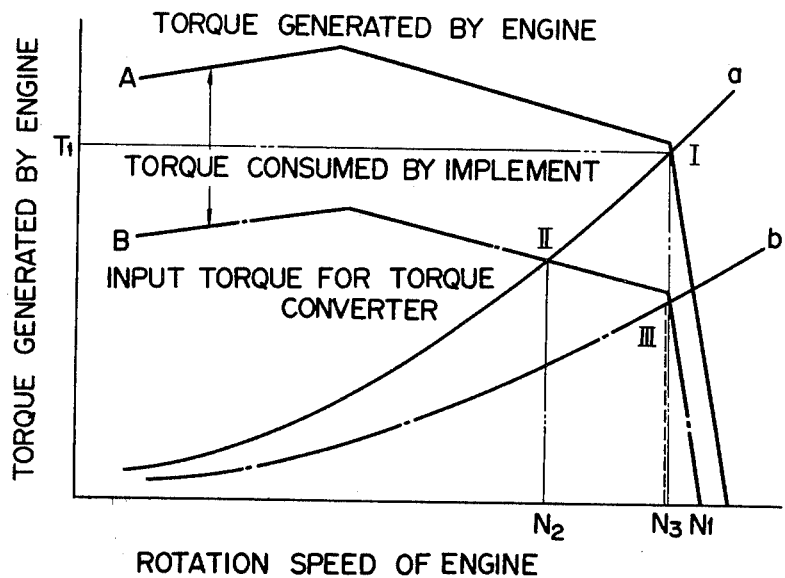
FIG. 4 is a graph showing a relationship between the rotation speed of an engine and the torque generated by the engine.

Therefore, the sun gear 7 is rotated with the pump impeller P at the same speed so that the torque converter 1 is put under its normal operating condition in which it can develop a large absorption torque as shown by a curve "a" in FIG. 4 thereby increasing the motive power for running (as indicated by $T_1$ in FIG. 4).

If under such condition the preset lever 62 is turned from a lock position L to a slip position S, then the load applied on the spring 58 is reduced so that in the similar manner as in the case of conventional reducing valves, the delivery pressure in the outlet port 54 is reduced thereby reducing the fluid pressure within the pressure chamber 14 of the high speed clutch H. Whilst, the sleeve 51 is slidably moved by the accelerator pedal 63 so as to change the distance L between a shoulder 56'a of reduced portion 56a of the spool 56 and a shoulder 55' of the second port 55. Therefore, the fluid pressure in the outlet port 54 is determined by both the amount of turning or movement of the preset lever 62 and the stroke of the accelerator pedal 63.

Figure 5:
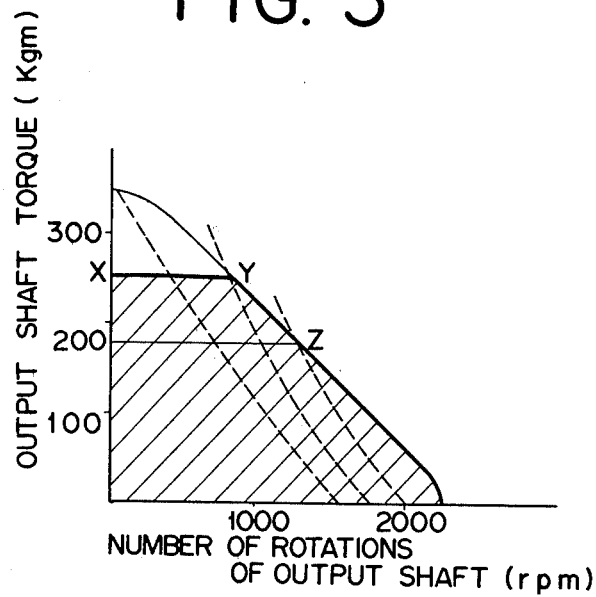
FIG. 5 is a graph showing a relationship between the number of revolutions of the output shaft and the torque transmitted thereby.

Stated in more detail, if the stroke of the accelerator pedal 63 is less than half of its maximum value (or at low idling), the above-mentioned distance L becomes long, then irrespective of the stroke or position of the preset lever 62, the fluid pressure in the outlet port 54 is kept at a preset value (for example, 20 kg/cm$^2$), and so the high speed clutch H will not slip even if the number of revolutions of the engine is reduced. However, if the stroke of the accelerator pedal 63 is more than half of its maximum stroke (or at high idling) and when a load is exerted on the engine so as to reduce the number of revolutions thereof below a predetermined value, the high speed clutch H will begin to slip. In this case, the torque developped by the output shaft of the torque converter 1 will vary as shown by X-Y-Z in FIG. 5, and so the maximum tractive force is reduced thereby preventing the slip and cut of the tires. In summary, the torque characteristics of the output shaft of the torque converter in this case will become as shown by oblique lines in FIG. 5, and so the stall torque (maximum tractive force) will reach its ceiling.

Therefore, when the road condition of the work site tends to cause slip of tires of the vehicle, if the stall torque is set at a desired value (below the tire slip torque) by setting the preset lever 62 at a slip position or at a position between the slip and lock positions and even if the accelerator pedal is fully depressed, the vehicle can be driven without causing slip of the tires thereby preventing wear-down of the tires and also increasing the life time thereof.

In brief, the clutch setting pressure can be made variable by the preset lever 62 and the preset number of revolutions at the slip of the clutch can be changed depending on the road condition, and in addition, in case of high idling (or high speed rotation) the fluid pressure in the outlet port 54 or that within the pressure chamber 14 can be reduced depnding on the position of the preset lever 62, whilst at the time of low idling (or low speed rotation) the said pressure can be increased irrespective of the position of the preset lever 62.

Next, when the implement operating valve 41 is operated to actuate the pistons of the cylinders 42 and 43, the fluid pressure in the delivery side 40a of the pump 40 is increased so that the fluid pressure actuated switch 39 is rendered operative or on and the solenoid 32a is energized thereby changing over the high/low speed changeover valve 32 to the second position II.

As a result, the pressurized fluid delivered by the charge pump 30 will flow through the low pressure passage 35 and the second passage 23 into the pressure chamber 22 of the low speed clutch L so as to allow the piston 21 to urge against the clutch plates 20 thereby actuating or engaging the low speed clutch L. On the other hand, the high speed clutch H is rendered inoperative or off because its pressure chamber 14 is connected with the tank 17.

Consequently, the torque converter 1 will develop a small absorption torque as shown by a curve "b" in FIG. 4 and so the number of revolutions of the engine will not drop remarkably and the hydraulic pump 40 can be run at a high speed thereby enabling the operation of the implement to be made at a high efficiency.

Further, if the implement valve 41 is moved from such condition to a neutral position, then the high/low speed changeover valve 32 will assume its first position I thereby allowing the pressurized fluid delivered by the charge pump 30 to be supplied through the pressure regulator valve 37 into the passage 18.

At that time, the spool 26 of the quick charge valve 16 is maintained by the spring 27 at a first position where the passage 18 is allowed to communicate with a large diameter opening 70 which communicates with the pressure chamber 14 so that the pressurized fluid can be introduced rapidly through the opening 70 into the pressure chamber 14. When the fluid pressure within the pressure chamber 14 rises to a certain level, the fluid pressure exerted on the inside of the back pressure chamber 26a will move the spool 26 against the biasing force of the spring 27 to the second position where the communication between the opening 70 and the passage 18 is cut off.

At the same time, the number of revolutions of the casing 2 will increase and the spool 24 of the centrifugal valve 15 is moved outwardly against the force of the spring 25 so as to allow the passage 18 to communicate through an inlet 71, a small hole 72, a passage 73, an outlet 74 and a small diameter opening 75 with the pressure chamber 14. Therefore, the pressurized fluid is supplied into the pressure chamber 14 thus rendering the high speed clutch on. At this time, drain port 76 is blocked.

As can be seen from the foregoing, when changing over the apparatus from the low clutch L to the high clutch H, the pressurized fluid can be quickly filled in the pressure chamber 14 thereby reducing the time lag remarkably.

If under such condition or at high idling of the engine a load is exerted to reduce the number of revolutions of the engine, then the spool 24 is moved by the action of the spring 25 to the first position thereof, and so the pressurized fluid in the pressure chamber 14 will flow through the small hole 72 and the drain port 76 into the tank 17. As a result, the fluid pressure within the pressure chamber 14 is reduced thereby causing a slip of the clutch plate 12 and limiting the amount of the torque transmitted to the output shaft 5. Accordingly, as aforementioned, the slip of tires can be prevented, thus the cut of tires can be prevented. Stating in more detail, tire slip can be avoided by preventing a torque more than the value at which the tires start to slip against the road surface to be transmitted to the tires, and also it can be ensured to prevent the occurrence of tire's slip depending on the road surface condition by changing or adjusting the fluid pressure within the pressure chamber 14.

Figure 6:
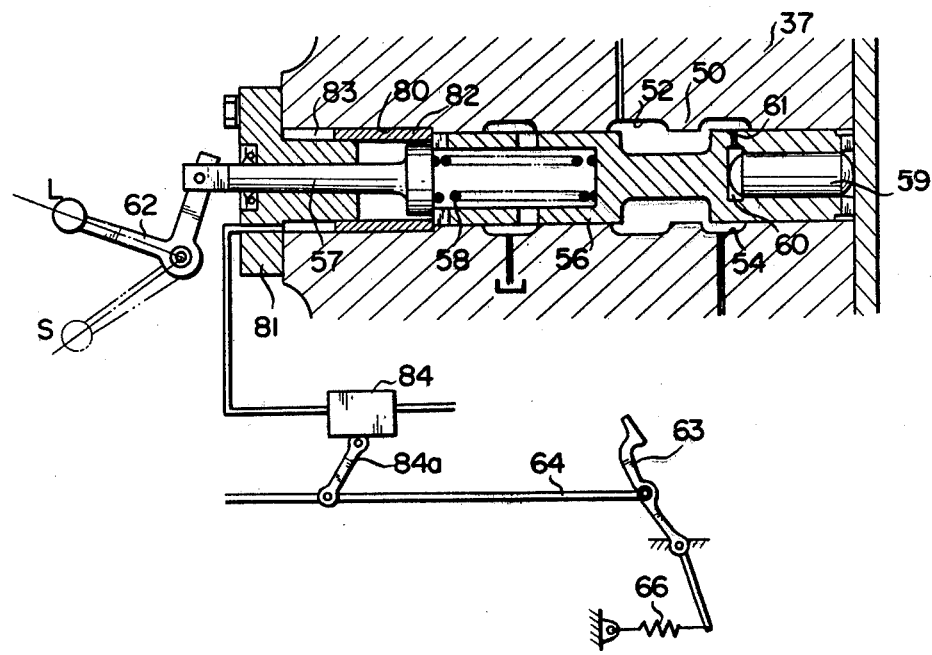
FIG. 6 is a cross-sectional view of another embodiment of regulating valve employed in the present invention.

Next, another embodiment of the pressure regulator valve 37 will be described below with reference to FIG. 6. In this example, the same component parts as those of the first embodiment are marked by the same reference numerals and characters.

Formed in the valve box 50 is a large diameter hole 80 in which a sleeve 82 is inserted. A cap member 81 is fixedly secured to the valve box 50 defining a pressure chamber 83 between the valve box 50, the sleeve 82 and the cap member 81. The sleeve 82 is adapted to abut against the spool 56. The pressure chamber 83 is connected through an air valve 84 with a pneumatic source (not shown). The air valve 84 has an operating rod 84 connected with a rod 64 so as to enable the pressure of the air to be supplied therein to be increased or decreased depending on the amount of operation of the accelerator pedal 63. In brief, when the accelerator pedal 63 is not depressed or the engine is at low idling, the compressed air is introduced through the air valve 84 into the pressure chamber 83 moving the sleeve 80 to the right in the drawing. Accordingly, the spool 56 is also moved rightwards thereby increasing the degree of opening of the outlet port 54. Even if under such condition the preset lever 62 is moved from its lock position to its slip position, because of the opening of the outlet port 54 being large, the fluid pressure in the outlet port 54 is not almost influenced, and is substantially kept constant. Therefore, at low idling of the engine, the high speed clutch H will not cause slip.

When the accelerator pedal 63 is depressed, the pressure of the compressed air within the chamber 83 is reduced by the air valve 84 so as to move the sleeve 80 and the spool 56 abutting thereagainst to the left in the drawing. As a result, the opening of the outlet port 54 is reduced. Further, if the preset lever 62 is moved from its lock position to its slip position, the opening of the outlet port 54 is reduced further and the fluid pressure in the outlet port 54 is reduced correspondingly. Stating in brief, as the preset lever 62 is moved to the slip position while the engine is at high idling, the high speed clutch H will cause a slip if the engine is subjected to a loading.

Since the present invention is constructed as mentioned above, at the time of low idling of the engine, the clutch H will not slip, whilst at the time of high idling thereof, the timing of slip of the clutch H can be altered as desired.

For this reason, at the time of low idling of the engine, power can be transmitted, and at the time of high idling thereof the generation of slip (or cut) of the tires can be prevented depending on the road surface condition.

While this invention is susceptible of embodiment in many different forms, there is shown in the drawings and has been described herein specific embodiments of the invention, with the understanding that the present disclosure is to be taken as an exemplification of the principle of the invention and is not intended to limit the invention to the embodiment illustrated.

What is claimed is:

1. An apparatus for controlling a clutch-equipped torque converter for use in a loader vehicle comprising,
   first clutch means disposed between input and output shafts of said torque converter and operatively connected with said torque converter;
   second clutch means disposed between said torque converter and the output shaft;
   a planetary gear set connected with said first and second clutch means and the output shaft;
   a tank for hydraulic fluid;
   pump means connected with said tank;
   an engine for driving said pump means and said loader vehicle;
   selector valve means connected with said pump means, said selector valve means having two positions and output side thereof being connected to either said first clutch means or said second clutch means;
   regulating valve means disposed between said selector valve means and said first clutch means; and
   control means operatively connected with said regulating valve means for controlling the same in such a way that the pressure of hydraulic fluid supplied into said first clutch means can freely be changed while said engine is in high idling region and can be kept constant while said engine is in low idling region.

2. The apparatus as defined in claim 1 further comprising quick charge valve means connected with said regulating valve means at its input side and with said first clutch means at its output side for quickly charging the hydraulic fluid into said first clutch means when said selector valve means is changed over from a second position where hydraulic fluid from said pump means is being supplied into said second clutch means to a first position where hydraulic fluid from said pump means is being supplied into said first clutch means via said regulating valve means, and centrifugal valve means connected with said regulating valve means at its input side and with said first clutch means at its output side, said centrifugal valve means being operatively connected with said quick charge valve means and adapted to communicate said first clutch means with a drain when the number of revolutions of said engine is suddenly reduced.

3. The apparatus as defined in claim 1 or 2 wherein said regulating valve means comprises a valve body, a sleeve slidably inserted within said valve body, a spool slidably mounted within said sleeve, a spring retainer mounted within said sleeve, and spring means disposed between said spool and said spring retainer, and wherein said control means comprises an accelerator for the engine connected with said sleeve, and spring force adjusting means connected with said spring retainer.

4. The apparatus as defined in claim 1 or 2 wherein said regulating valve means comprises a valve body, a spool slidably mounted within said valve body, a sleeve slidably mounted within said valve body, one end of said sleeve being adapted to contact with said spool, a cap member fixedly secured to said valve body defining a pressure chamber between said valve body, said cap member and said sleeve, said cap member having a hole formed therein, a spring retainer slidably inserted within the hole of said cap member, and spring means disposed between said spool and said spring retainer, and wherein said control means comprises an accelerator for the engine, air valve means connected to an air tank containing compressed air therein and said pressure chamber, said air valve means being operatively connected with said accelerator, and spring force adjusting means connected with said spring retainer.

* * * * *